United States Patent
Rodman et al.

(10) Patent No.: US 12,516,622 B1
(45) Date of Patent: Jan. 6, 2026

(54) COOLANT SYSTEM BYPASS FOR ENGINE

(71) Applicant: Caterpillar Inc., Peoria, IL (US)

(72) Inventors: Anthony C. Rodman, Peoria, IL (US); Eric L. Schroeder, Germantown Hills, IL (US); Amit P. Bhole, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/982,424

(22) Filed: Dec. 16, 2024

(51) Int. Cl.
    *F02B 29/04* (2006.01)
(52) U.S. Cl.
    CPC ...... *F02B 29/0418* (2013.01); *F02B 29/0493* (2013.01); *F02B 29/0437* (2013.01)
(58) Field of Classification Search
    CPC .............. F02B 29/0418; F02B 29/0437; F02B 29/0493
See application file for complete search history.

(56) References Cited

U.S. PATENT DOCUMENTS

| | | | |
|---|---|---|---|
| 6,293,262 | B1 | 9/2001 | Craig et al. |
| 6,408,831 | B1 | 6/2002 | Craig et al. |
| 6,681,171 | B2 | 1/2004 | Rimnac et al. |
| 9,127,626 | B2 | 9/2015 | Banker et al. |
| 9,353,694 | B2 | 5/2016 | Song et al. |
| 9,394,858 | B2 | 7/2016 | Richards et al. |
| 9,410,509 | B2 | 8/2016 | Roth et al. |
| 10,082,109 | B2 | 9/2018 | Engfehr et al. |
| 10,859,044 | B2 | 12/2020 | Dudar |
| 11,549,451 | B1 * | 1/2023 | Bardell ............... F02B 29/0425 |
| 11,649,758 | B1 | 5/2023 | Kareemullah et al. |
| 2018/0016967 | A1 * | 1/2018 | Moore ............ F02M 35/10157 |

FOREIGN PATENT DOCUMENTS

| | | | | |
|---|---|---|---|---|
| AT | 525355 | B1 * | 3/2023 | .......... F02B 29/0412 |
| DE | 102017113167 | A1 * | 12/2017 | ............ B60K 13/02 |
| EP | 1211400 | B1 | 12/2007 | |
| KR | 101978254 | B1 | 5/2019 | |
| WO | WO-2009002233 | A1 * | 12/2008 | .......... F02B 29/0412 |

* cited by examiner

*Primary Examiner* — Ngoc T Nguyen
(74) *Attorney, Agent, or Firm* — Bookoff McAndrews, PLLC

(57) ABSTRACT

An intake manifold temperature system including an internal combustion engine, an intake manifold connected to the internal combustion engine, an air supply system configured to supply compressed air to the internal combustion engine, an ambient condition sensor, an air system sensor, a manifold condition sensor, and a controller. The air supply system may include a compressor, an air cooler connected downstream of the compressor, a bypass passage connected downstream of the compressor to provide compressed air to the intake manifold, the air having bypassed the air cooler, and an electronically-controlled bypass valve connected downstream of the compressor, the bypass valve configured to control a proportion of air flow through the bypass passage and through the air cooler. The controller may be configured to actuate the bypass valve based on signals and a desired intake manifold temperature.

20 Claims, 4 Drawing Sheets

COOLANT SYSTEM BYPASS FOR ENGINE

TECHNICAL FIELD

The present disclosure relates generally to methods and systems for internal combustion engines and, more particularly, to systems and methods for controlling flow of air, or flow of an air and fuel mixture, to an internal combustion engine.

BACKGROUND

Internal combustion engine designs are increasingly diversifying, enabling combustion of various types of fuels, either instead of or in addition to traditional fuels, such as diesel fuel or gasoline. Internal combustion engines designed for use with so-called "alternative" fuels may be capable of combusting a high amount of an alternative fuel (e.g., an alcohol, such as methanol or ethanol, or another fuel that result in relatively lower emissions of carbon-containing compounds). The alternative fuel can be combusted using another fuel, such as diesel fuel, that generates a pilot flame to initiate combustion of the alternative fuel. Generally, greater environmental benefits can be achieved by substituting increasing amounts of traditional fuel, such as diesel fuel, with an alternative fuel. Some of these engine systems operate at loads below the maximum load capability of the engine for some period of time.

While internal combustion engines designed for use with so-called "alternative" fuels, such as methanol and ethanol, introduce benefits such as improved emissions performance, there are challenges associated with the use of these engines. For example, these alternative fuel combustion systems (e.g., systems that store fuel in liquid form and/or supply fuel in liquid form to one or more fuel injectors), may tend to experience low intake manifold temperatures when operated at sub-maximum loads. These relatively low temperatures can result in reduced emissions performance and lower the amount of alternative fuel that can be used as a substitute, for example, for diesel fuel.

An internal combustion engine is described in U.S. Pat. No. 9,394,858 B2 to Richards ("the '858 patent"). The internal combustion engine described in the '858 patent includes an exhaust gas recirculation (EGR) passage, a compressor bypass valve coupled in series between the inlet and the outlet of a compressor, and a charge air cooler (CAC) downstream of both the EGR passage and of the compressor. The compressor bypass valve and the EGR passage function to divert an amount of exhaust from the compressor. The amount of exhaust diverted from the compressor is determined based on the temperature of the CAC. While the combustion engine described in the '858 patent may be useful for introducing exhaust gas into an intake air change for EGR, it may be unable to aid the engine in compensating for low ambient temperatures or for low engine load, or may require other tradeoffs that negatively impact engine function, such as a reduced air-fuel ratio.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, an intake manifold temperature system is disclosed. The intake manifold temperature system may include an internal combustion engine, an intake manifold connected to the internal combustion engine, an air supply system configured to supply compressed air to the internal combustion engine, an ambient condition sensor, an air system sensor, a manifold condition sensor, and a controller. The air supply system may include a compressor, an air cooler connected downstream of the compressor, a bypass passage connected downstream of the compressor to provide compressed air to the intake manifold, the air having bypassed the air cooler, and an electronically-controlled bypass valve connected downstream of the compressor, the bypass valve configured to control a proportion of air flow through the bypass passage and through the air cooler. The controller may be configured to receive signals from the ambient condition sensor, the air system sensor, and the manifold condition sensor, and generate commands for actuating the bypass valve based on the signals and based on a desired intake manifold temperature.

In another aspect, a method for generating commands to actuate a bypass valve of an internal combustion engine system is disclosed. The method may include receiving signals from an ambient condition sensor, an air system sensor, and a manifold condition sensor, determining a desired intake manifold temperature for an intake manifold connected to an internal combustion engine, generating a command for actuating a bypass valve based on the signals and based on the desired intake manifold temperature, and actuating the bypass valve based on the command such that air is provided to a bypass passage connected downstream of a compressor to provide compressed air to the intake manifold so as to bypass an air cooler.

In a further aspect, an intake manifold temperature system is disclosed. The intake manifold temperature system may include an internal combustion engine, an intake manifold connected to the internal combustion engine, an air supply system configured to supply compressed air to the internal combustion engine, an ambient condition sensor located in a compressor intake manifold, an air system sensor located in a compressor output manifold, a manifold condition sensor located in the intake manifold connected to the internal combustion engine, and a controller. The air supply system may include a compressor, an air cooler connected downstream of the compressor, a bypass passage connected downstream of the compressor to provide compressed air to the intake manifold so as to bypass the air cooler, and an electronically-controlled bypass valve connected downstream of the compressor and upstream of the air cooler. The bypass valve may be configured to increase a proportion of air flow to the bypass passage, and decrease the proportion of air flow to the bypass passage. The controller configured to receive temperature signals or pressure signals from the ambient condition sensor, the air system sensor, or the manifold condition sensor and generate commands for actuating the bypass valve based on the signals and on a desired intake manifold temperature, including commands for causing the bypass valve to increase the proportion of the air flow to the bypass passage and when an intake manifold temperature measured with the manifold condition sensor is less than the desired intake manifold temperature and commands for causing the bypass valve to decrease the proportion of air flow to the bypass passage when the intake manifold temperature measured with the manifold condition sensor is above the desired intake manifold temperature.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic. As used herein, "intake air" is defined to include both air that is free of fuel, and air containing at least some fuel, whether this fuel is in liquid form, vaporized form, or a mix of liquid droplets and vaporized fuel, unless it is specifically stated that the air contains no fuel.

Figure 1:
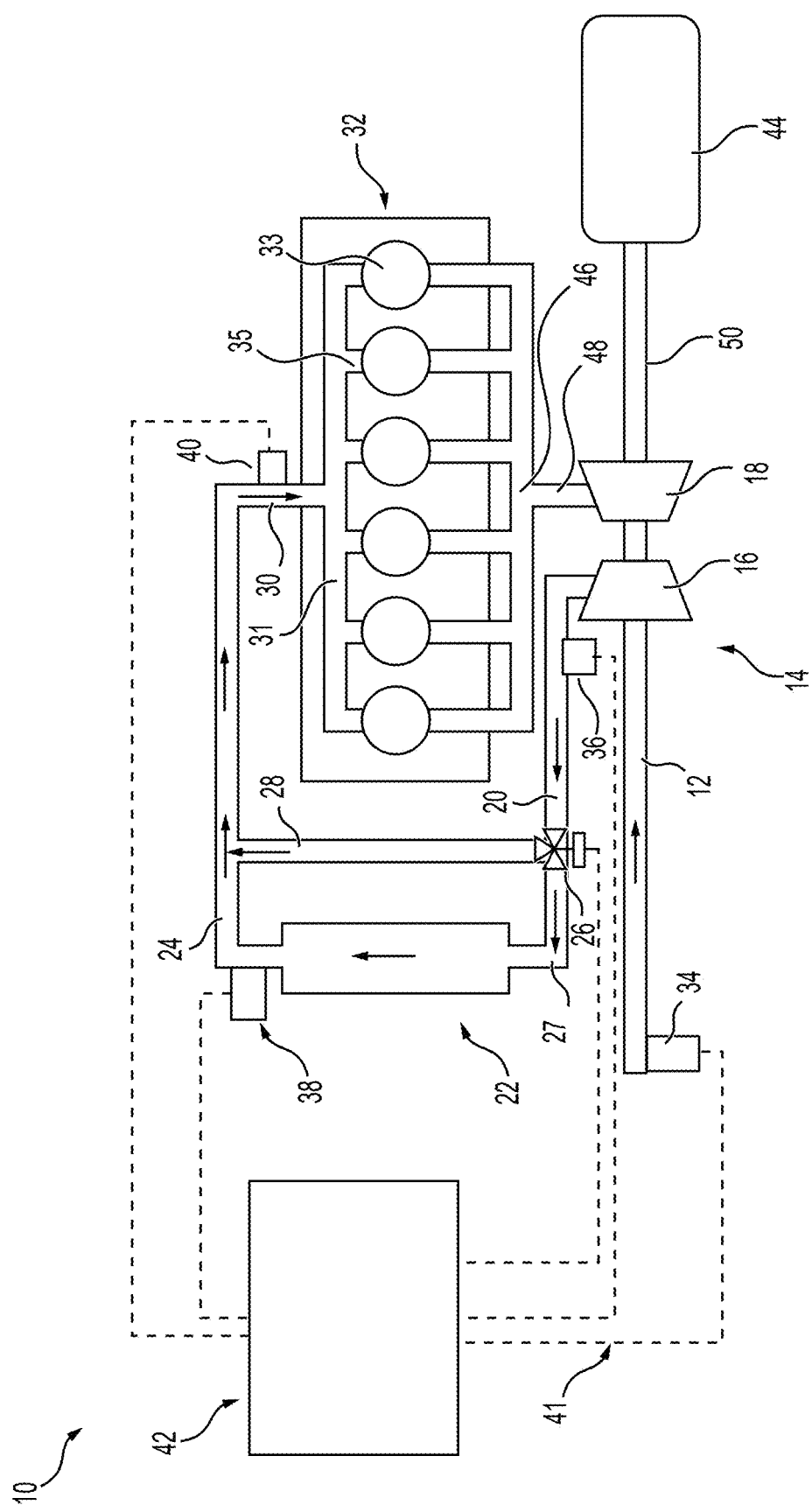
FIG. 1 is a schematic view of an intake and combustion system, according to aspects of the disclosure.

FIG. 1 illustrates an exemplary intake and combustion system 10, according to aspects of the invention. Intake and combustion system 10 may be part of a marine vessel, machine, vehicle, or power generation system, and may include an internal combustion engine 32 and an air and fuel supply system 14. Air and fuel supply system 14 may be connected to engine 32 and may facilitate compression of intake air, introduction of fuel to the compressed air, and supply of the compressed air and fuel to engine 32.

Intake and combustion system 10 may include one or more electronically-controlled components, such as a flow control valve 26, one or more feedback devices (e.g., sensors), and one or more electronic control devices. Feedback devices of intake and combustion system 10 may be included in a sensor system 41 that includes sensors configured to generate signals that facilitate control of flow control valve 26. An electronic control module (ECM) 42 of system 10 may monitor conditions of system 10 via sensor system 41. ECM 42 may be configured, via programming, to generate commands to facilitate desired operation of the electronically-controlled components, such as valve 26, based on signals received from sensor system 41. ECM 42 may be a control module for controlling multiple functions of system 10 and engine 32, as shown in FIG. 1. Alternatively, ECM 42 may be an electronic control module or control unit that is dedicated for controlling aspects of air and fuel supply system 14, and specifically, flow control valve 26.

Engine 32 may include a plurality of cylinders 33 in which fuel injected by a fuel injector may be combusted. Engine 32 may include one or more fuel injectors configured to inject a second fuel, such as diesel fuel, directly into respective cylinders 33 of engine 14. The second fuel may be useful to generate a flame that ignites a first fuel that was injected by the same fuel injector, a different fuel injector, or other suitable device. While internal combustion engine 32 is illustrated in FIG. 1 as an 6-cylinder engine having one cylinder bank, as understood, engine 32 may have more or fewer cylinders 33 and may have more than one cylinder bank.

Suitable primary fuels for engine 32 may include fuels stored in liquid form, such as an alcohol. Exemplary primary fuels may include: methanol, ethanol, butanol, propanol, and/or other alcohols, including blends thereof, ammonia, or dimethyl ether. An alcohol-containing liquid fuel may have at least about 50% alcohol by volume, such as fuel containing about 85% methanol by volume or about 85% ethanol by volume. Engine 14 may also be configured to operate entirely on fuel injected with one or more direct fuel injectors (not shown). Thus, depending on operating conditions, engine 14 may operate entirely on the primary fuel, such as methanol, on a mixture of the alternative fuel (e.g., by providing each cylinder 33 with a spark plug, pre-combustion chamber, etc.), or entirely on the second fuel.

Air and fuel supply system 14 may include a series of passages for supplying air to engine 32, including an air intake passage 12, an air compressor 16, and a compressed air passage 20 downstream of an outlet of compressor 16. Air and fuel supply system 14 may also include a compressed air cooler 22 (also referred to as an "aftercooler") connected to an air cooler outlet passage 24, a bypass passage 28 for compressed air to bypass air cooler 22, and an intake manifold 30 including an intake plenum 31 and plurality of runners 35.

Air and fuel supply system 14 may also include components for supplying fuel (e.g., fuel stored as a liquid) to engine 32, as described below. Air intake 12 may include one or more passages, air filters, etc., configured to guide ambient air drawn from outside of engine 32. Compressor 16, connected downstream of air intake 12, may be a centrifugal compressor connected to a turbine 18 via a shaft, to compress air for combustion in engine 32. An outlet of compressor 16 may connect to compressed air passage 20. While compressor 16 may be driven by flow of exhaust through turbine 18, if desired, compressor 16 may otherwise mechanically-driven or electrically-driven.

Air and fuel supply system 14 may include a bifurcated path for intake air downstream of compressor 16, for example extending from compressed air passage 20. In the configuration shown in FIG. 1, a first path may extend from the outlet of compressor 16, this first path including compressed air passage 20, flow control valve 26, air cooler inlet passage 27, air cooler 22, and air cooler outlet 24. A second path may also extend from the outlet of compressor 16. This second path may include compressed air passage 20, flow control valve 26, and bypass passage 28. As shown in FIG. 1, bypass passage 28 may extend from compressed air passage 20 so as to form a junction with compressed air passage 20 and with air cooler inlet passage 27. In the illustrated configuration, flow control valve 26 is included as part of both the first path and the second path. However, flow control valve 26 may be provided at other locations, such as at the junction of air cooler outlet 24 and bypass passage 28.

Intake plenum 31 may be connected downstream of both bypass passage 28 and air cooler outlet 24. Intake plenum 31 may be part of an intake manifold 30 that also includes a plurality of runners 35 respectively connected to cylinders 33 of internal combustion engine 32. Each runner 35 of intake manifold 30 may connect a respective engine cylinder 33 of internal combustion engine 32 to intake plenum 31 so as to supply air and fuel to this cylinder 33.

Downstream of cylinders 33, an exhaust manifold 46 may be configured to receive exhaust generated by the combustion of air and fuel. This exhaust may be guided by an outlet passage 48 to an inlet of a turbine 18. Turbine 18 may be driven by exhaust exiting engine 32. An exhaust outlet 50 passage may be connected downstream of turbine 18. If desired, exhaust outlet 50 may connect to one or more aftertreatment devices 44, such as a catalyst or particulate filter, to reduce emissions of undesirable combustion products, such as NOx, CO, or soot.

Flow control valve 26 may be configured to regulate flow of air that is supplied to air cooler 22. Flow control valve 26 may be connected upstream of air cooler 22, and in particular, between air cooler 22 and compressor 16. In at least some configurations, flow control valve 26 may be positioned in compressed air passage 20 at a location downstream of a junction of compressed air passage 20 and bypass passage 28, as depicted in FIG. 1. Valve 26 may be a butterfly valve, a solenoid valve, a spool valve, a flow diverter valve, or any other suitable type of valve configured to regulate a flow from compressor 16 to air cooler 22 according to the location of valve 26. In some aspects, valve 26 may be a combination of valves that may be modulated together. For example, valve 26 may include a first valve that diverts to air cooler inlet passage 27 and a second valve that diverts to bypass passage 28.

In at least some embodiments, flow control valve 26 may be a two-way valve, or a three-way proportional valve, as shown in FIG. 1. Flow control valve 26 may include an inlet downstream of compressor 16, a first outlet in communication with air cooler 22, and a second outlet in communication with bypass passage 28, such that a flow of intake air that passes through the first outlet does not enter bypass passage 28, and a flow of intake air that passes through the second outlet bypasses air cooler 22. In at least some embodiments, flow control valve 26 is a two-way valve with one inlet and one outlet, flow control valve 26 being positioned in bypass passage 28 (e.g., not at a junction).

Flow control valve 26 may control the proportion of air that flows through cooler 22 and through passage 28. In some aspects, flow control valve 26 may have a first position in which an entire flow through valve 26 is directed to air cooler 22, and a second position in which an entire flow through valve 26 is directed to bypass passage 28. Flow control valve 26 may be a proportional valve including a plurality of third positions between the first position and the second position in which at least some flow passes through valve 26 to air cooler 22 and at least some flow passes through valve 26 to bypass passage 28. For example, the third position may be one of a plurality of intermediate positions in which flow from compressed air passage 20 to air cooler 22 is regulated such that at least some flow is diverted from compressed air passage 20 to bypass passage 28. When flow control valve 26 is a proportional valve, the flow permitted to air cooler 22 as compared to the flow permitted towards bypass passage 28 may be determined by ECM 42, as described below. ECM 42 may further be configured to control valve 26 in configurations where valve 26 is not a proportional valve.

Whether flow control valve 26 is a three-way valve or a two-way valve, valve 26 may be electronically-controlled. In particular, flow control valve 26 may be controlled by ECM 42 based on one or more signals generated by sensor system 41.

Air cooler 22 may be an air-to-air cooler, an air-to-liquid cooler, or other type of device for cooling intake air. In configurations where air cooler 22 is an air-to-air cooler or an air-to-liquid cooler, air entering cooler 22 may haves a higher temperature than that of the heat transfer fluid (air in the case of an air-to-air cooler and water or other coolant in the case of an air-to-liquid cooler).

Sensor system 41 may include sensors for monitoring aspects of air and fuel supply system 14 and/or of engine 32. In the exemplary configuration illustrated in FIG. 1, sensor system 41 includes an ambient condition sensor 34, an air system sensor 36, an air cooler outlet sensor 38, and a manifold condition sensor 40. Ambient condition sensor 34 may include a temperature sensor configured to generate a signal that indicates a temperature of ambient air or a temperature of intake air supplied to or within air intake 12, or a pressure sensor configured to generate a signal that indicates a pressure of ambient air or a pressure of intake air supplied to or within air intake 12. In some configurations, ambient condition sensor 34 includes a temperature sensor and a pressure sensor. Air system sensor 36 may include a temperature sensor configured to generate a signal that indicates a temperature of air output from compressor 16, a pressure sensor configured to generate a signal that indicates a pressure of air output from compressor 16, or both. Air cooler outlet sensor 38 may include a temperature sensor configured to generate a signal that indicates a temperature of air output from cooler 22 (e.g., air supplied to or within air cooler outlet passage 24), a pressure sensor configured to generate a signal that indicates a pressure of air output from cooler 22. Manifold condition sensor 40 may include a temperature sensor configured to generate a signal that indicates a temperature of intake air supplied to or within intake manifold 30, a pressure sensor configured to generate a signal that indicates a pressure of intake air supplied to or within intake manifold 30, or both.

As understood, the signals generated by any of ambient condition sensor 34, air system sensor 36, air cooler outlet sensor 38, or a manifold condition sensor 40 may correspond to an air and fuel mixture. As further understood, the signals generated by any of ambient condition sensor 34, air system sensor 36, air cooler outlet sensor 38, or a manifold condition sensor 40 may be virtual (e.g., calculated) or measured. A virtual signal may be derived based on surrounding sensor signals. A measured signal may be a reading of any of the sensors of sensor system 41.

ECM 42 may be enabled, via programming, to receive signals from sensors of system 41 and to generate commands for control valve 26. In particular, ECM 42 may be configured to control a position of flow control valve 26 based on one or more signal received from sensor system 41 to control the temperature of intake manifold 30.

ECM 42 may embody a single microprocessor or multiple microprocessors that receive inputs and generate outputs. ECM 42 may include a memory, a secondary storage device, a processor such as a central processing unit, or any other means for accomplishing a task consistent with the present disclosure. The memory or secondary storage device associated with ECM 42 may store data and software to allow ECM 42 to perform its functions, including the functions described with respect to method 400, described below. Numerous commercially available microprocessors can be configured to perform the functions of ECM 42. Various other known circuits may be associated with ECM 42, including signal-conditioning circuitry, communication circuitry, and other appropriate circuitry.

Figure 2:
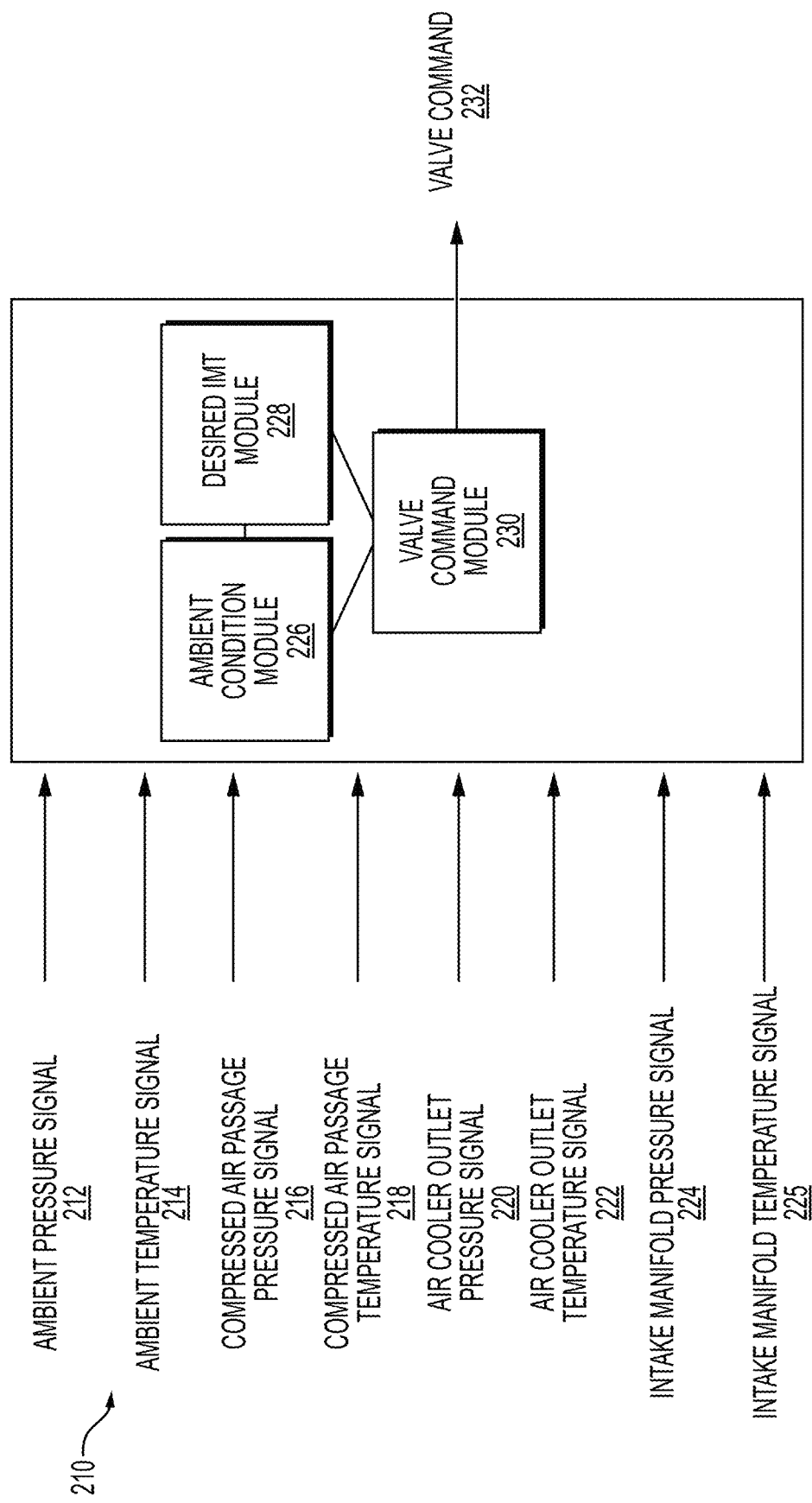
FIG. 2 is a block diagram representing an electronic control module for the intake and combustion system of FIG. 1.

FIG. 2 is a block diagram illustrating an exemplary configuration of ECM 42. As shown in FIG. 2, ECM 42 may receive signals 210, including inputs generated by sensor system 41, as described above. ECM 42 may include one or more modules (e.g., programming) that enable ECM 42 to generate a valve command 232 that is based, at least in part, on one or more signals 210. ECM 42 may include an ambient condition module 226 that allows ECM 42 to determine an ambient condition, such as an ambient temperature, an ambient pressure, or both based on one or more signals 210. A desired intake manifold temperature (IMT) module 228 of ECM 42 may receive the ambient temperature, the ambient pressure, or both from ambient condition module 226, and may generate a desired IMT that represents a target temperature for intake manifold 30 based on one or more signals 210 and the ambient pressure, the ambient temperature, or both. A valve command module 230 may receive the desired IMT from desired IMT module 228, and may generate a valve command 232 for controlling flow control valve 26 based on one or more signals 210 and based on the desired IMT.

Signals 210 may include signals generated with one or more sensors of sensor system 41. For example, ambient pressure signal 212 may be generated with ambient condition sensor 34 to indicate a pressure of air received by air intake 12. Ambient temperature signal 214 may be generated with ambient condition sensor 34 to indicate a temperature of air received by air intake 12. A compressed air passage pressure signal 216 may be generated with air system sensor 36 to indicate a pressure of air received by compressed air passage 20. A compressor output manifold temperature signal 218 may be generated with air system sensor 36 to indicate a temperature of air received by compressed air passage 20. An air cooler outlet pressure signal 220 may be generated with air cooler outlet sensor 38 to indicate a pressure of air received by air cooler outlet 24. An air system temperature signal 222 may be generated with air cooler outlet sensor 38 to indicate a temperature of air received by air cooler outlet 24. An intake manifold pressure signal 224 may be generated with manifold condition sensor 40 to indicate a pressure of air received by intake manifold 30. An air system temperature signal 225 may be generated with manifold condition sensor 40 to indicate a temperature of air received by intake manifold 30.

Desired IMT module 228 may determine a desired IMT by setting IMT as a fixed value. In other embodiments, module 228 may be configured to change the desired IMT over time. Desired IMT module 228 may determine the desired IMT based on ambient temperature, an engine maximum load, an engine operating load, fuel type, desired alternative fuel substitution rate, or other operating conditions, etc. For example, module 228 may set a higher desired IMT for an engine operating in conjunction with a primary fuel that has a higher vaporization temperature, a higher latent heat of vaporization, etc. In some embodiments, desired IMT module 228 may determine the desired IMT based on a minimum coolant temperature.

Valve command module 230 may receive the desired IMT from desired IMT module 228. As described above, this desired IMT may include a desired IMT for engine 32 based on based on one or more signals 210, the ambient pressure, the ambient temperature, or a combination thereof. In some aspects, valve command module 230 may generate a bypass command for flow control valve 26 based on this desired IMT and based on signals 210.

In some aspects, valve command module 230 may generate valve command 232 to command flow control valve 26 in a manner that ensures engine 32 achieves the desired IMT. In some aspects, valve command module 230 may include mathematical relationships and/or a model that calculates a position of valve 26 that enables engine 32 to achieve the desired IMT. For example, valve command module 230 may be configured to determine whether current engine conditions represented by signals 210 would result in a sufficient temperature increase to achieve the desired IMT. Under conditions where the resulting IMT is lower than the desired IMT determined with module 228, valve command module 230 may generate a valve command 232 that increases the amount of intake air that bypasses air cooler 22, allowing for more heat retained from the air to transfer to intake manifold 30 and ultimately to engine 32, thereby increasing the temperature of engine 32. This example is further depicted by FIG. 3.

Valve command module 230 may use a feedforward system to adaptively actuate valve 26 to cause air bypass from a cooler, enabling relatively warmer air to be directed to the IMT, thereby increasing engine 32 temperature to a level conducive to optimal system performance. Further, since valve command module 230 may also provide feedback once the desired IMT has been reached, valve 26 can be actuated to reduce air bypass from the cooler, thereby avoiding overheating.

Figure 3:
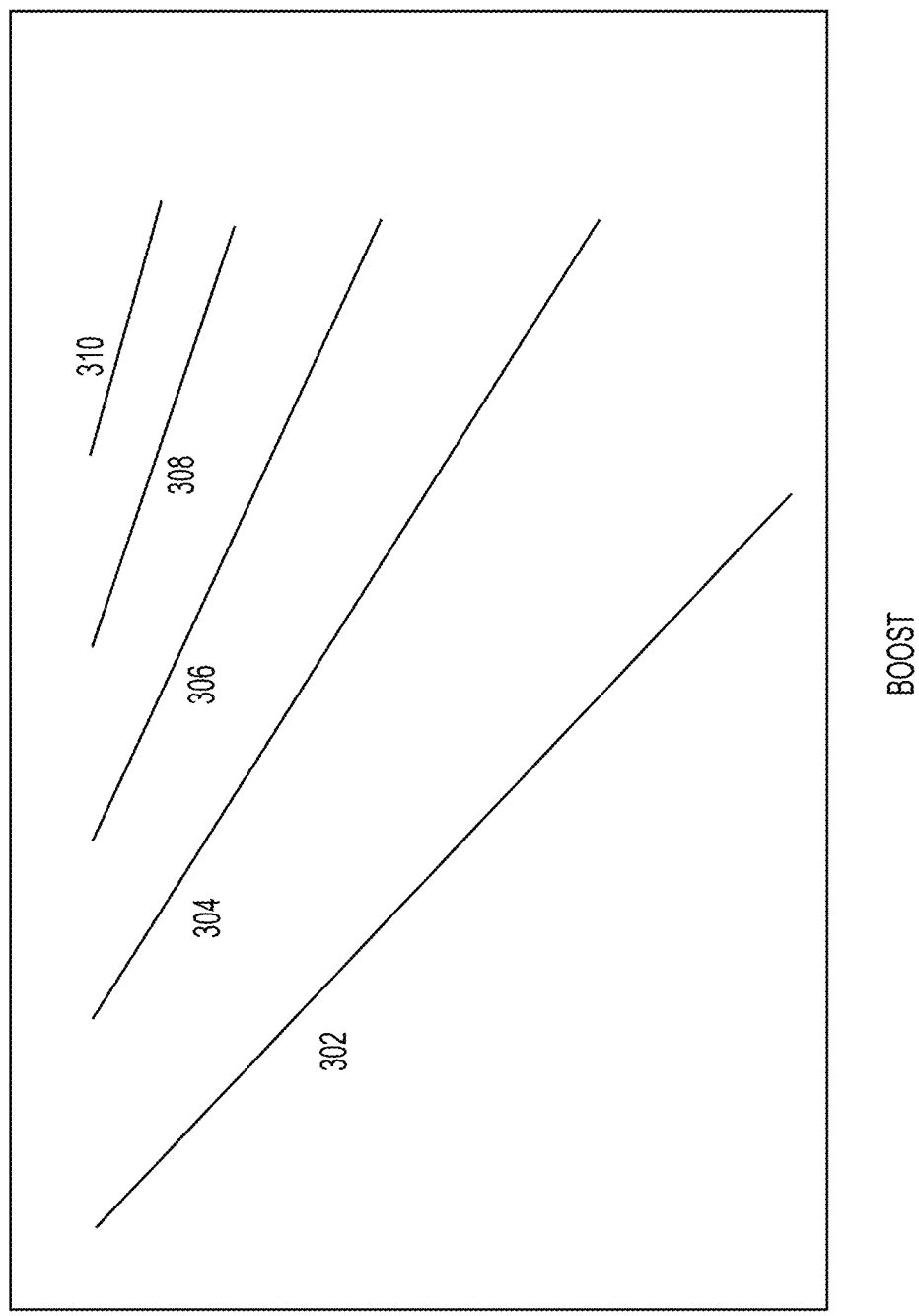
FIG. 3 is a chart depicting exemplary temperature change relative to boost for the intake and combustion system of FIG. 1.

FIG. 3 is a graph showing exemplary temperature changes relative to boost for the intake and combustion system 10 of FIG. 1, according to aspects of the invention. FIG. 3 illustrates example regions 302, 304, 306, 308, and 310 each of which represents a particular command for valve 26. For example, region 302 illustrates conditions (e.g., low load and/or low ambient temperature) in which valve 26 is commanded to cause 100% of the flow of air to bypass cooler 22. Region 310 illustrates high load and/or high ambient temperature conditions. Region 310 represents conditions in which ECM 42 commands valve 26 to cause no air to bypass cooler 22 (e.g., 100% of the flow of air is directed through cooler 22). Regions 304, 306, and 308 illustrate regions where valve 26 is commanded to progressively increase the amount of air that bypasses cooler 22, increasing from a zero or near-zero value of region 302 to a 100% or near 100% value in region 310. It should be noted that FIG. 3 may be representative of a target IMT, and that regions 302, 304, 306, 308, and 310 may vary based on target IMT, fuel type, desired alternative fuel substitution rate, other factors, etc.

Figure 4:
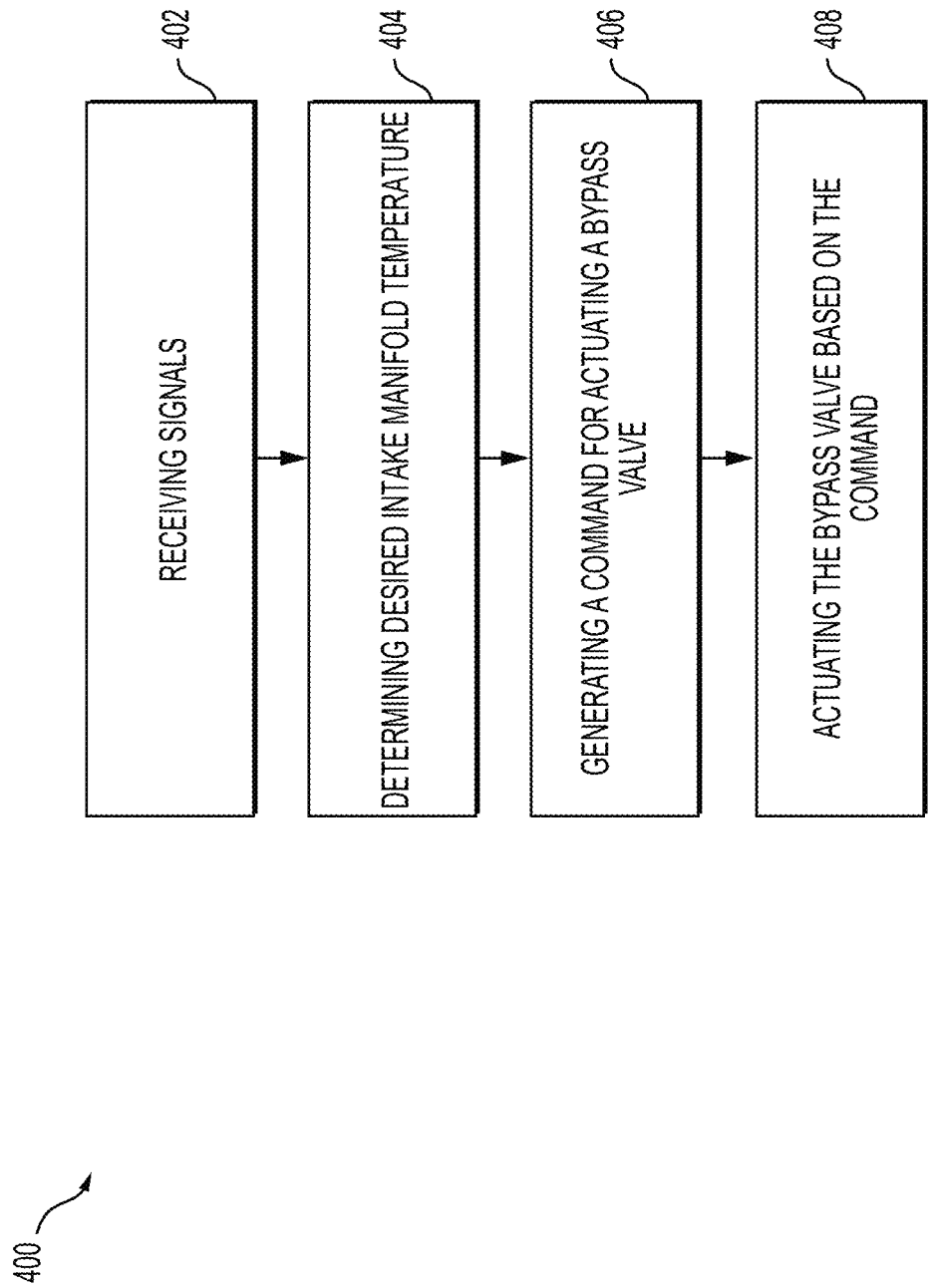
FIG. 4 is a flowchart depicting an exemplary intake manifold temperature method useful with the intake and combustion system of FIG. 1.

FIG. 4 is a flowchart depicting an exemplary intake manifold temperature method 400 useful with the intake and combustion system of FIG. 1. During operation of system 10 according to method 400, signals 210 (FIG. 2) may be received during a step 402. In some aspects, signals 210 received at step 402 may be measured values or calculated values. Any combination of signals 210 may be received. For example, one or more virtual signals 210 and one or more measured signals 210 may be received.

In addition to signals 212, 214, 216, 218, 220, 222, 224, and/or 225 (FIG. 2), the desired IMT may be determined by desired IMT module 228 at step 404. The desired IMT may enable ECM 42 to determine whether the desired IMT may be achieved. As discussed above, the desired IMT may be a fixed value or may be changed over time, such as based on ambient temperature, an engine maximum load, an engine operating load, fuel type, other operating conditions, etc. In some aspects, ECM 42 may determine the desired IMT using mathematical relationships and/or a model-based approach. A model-based approach may involve a model for temperature increase of engine 32 relative to the ambient temperature and/or boost of engine 32. Other data useful for desired IMT modeling may include engine load and other conditions of system 10.

When ECM 42 determines, during step 406, that the IMT temperature needs to increase to reach the desired IMT, ECM 42 may generate valve command 232 to block flow to cooler 22 or reduce flow to cooler 22, in response to determining that current engine conditions may cause some of the air to reach engine 32 in a lower temperature in the absence of a bypass command. Valve command 232 generated during step 406 may cause at least some air from compressor 16 to bypass air cooler 22, entering intake manifold 30 via bypass passage 28.

A step 408 may include causing at least some of the air compressed by compressor 16 to bypass a cooler, such as air cooler 22. This may tend to increase the temperature of air supplied to engine 32. In some aspects, step 408 may include causing at least some of the air compressed by compressor 16 to bypass air cooler 22 based on the valve command 232 generated at step 406. The valve command 232 may actuate bypass valve 26 such that valve 26 may open or close based on the valve command 232. For example, bypass valve 26 may increase the proportion of air flow to the bypass passage and the air cooler based on the valve command 232, based on a determination that the desired intake manifold temperature has not been reached, or both. In another example, bypass valve 26 may decrease the proportion of air flow to the bypass passage and the air cooler based on the valve command 232, based on a determination that the desired intake manifold temperature is measured, or both.

While steps 402, 404, 406, and 408 of method 400 were described in an exemplary order, and are shown in an exemplary order in FIG. 4, as understood, one or more of the steps may be performed in a different order, at partially or entirely overlapping periods of time, etc. Additionally, one or more of the steps 402, 404, 406, 408, and other aspects of method 400 may be performed intermittently during the operation of engine 32, while one or more other steps or aspects of method 400 may be performed continuously during operation of engine 32. For example, compressed air may be supplied at regular or continuous periods during operation of engine 32, while the period of time during which air bypasses cooler 22 may be intermittent or periodic, based on the above-described determinations performed by ECM 42 and current operating conditions of system 10. Thus, system 10 and ECM 42 may, as part of method 400, evaluate when it is desirable to cause air, fuel, or both, to bypass air cooler 22 to facilitate achievement of the desired IMT.

The disclosed system and method may facilitate engine temperature optimization, such as when ambient temperature or pressure conditions are low and the engine load is low. In a particular example, the disclosed system and method may be useful during at least some operating conditions for enabling air to bypass a cooler. The disclosed system and method may be configured to reduce overcooling, even when an internal combustion engine operates at partial load or low load conditions. By using a feedforward system to adaptively actuate a valve to cause air bypass from a cooler, relatively warmer air may be directed to the IMT, thereby increasing the engine temperature to a level conducive to optimal system performance. Further, since the system also provides feedback once the desired IMT has been reached, the valve can be actuated to reduce air bypass from the cooler, thereby avoiding overheating. The system described herein—adaptive to real-time engine operating conditions and ambient temperatures—supports optimal system performance by maintaining an optimal IMT. This disclosed system and method may improve engine conversion efficiency, reductant dosing capability, substitution rate, combustion stability, etc.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. An intake manifold temperature system, comprising:
an internal combustion engine;
an intake manifold connected to the internal combustion engine;
an air supply system configured to supply compressed air to the internal combustion engine, the air supply system including:
a compressor;
an air cooler connected downstream of the compressor;
a bypass passage connected downstream of the compressor to provide compressed air to the intake manifold, the air having bypassed the air cooler; and
an electronically-controlled bypass valve connected downstream of the compressor, the bypass valve configured to control a proportion of air flow through the bypass passage and through the air cooler;
an ambient condition sensor;
an air system sensor;
a manifold condition sensor; and
a controller configured to:
receive signals from the ambient condition sensor, the air system sensor, and the manifold condition sensor,
determine a desired intake manifold temperature based on the received signals; and
generate commands for actuating the bypass valve based on the signals and based on the desired intake manifold temperature.

2. The intake manifold temperature system of claim 1, wherein the ambient condition sensor includes an ambient pressure sensor and an ambient temperature sensor.

3. The intake manifold temperature system of claim 1, wherein the air system sensor is connected to a compressor output passage.

4. The intake manifold temperature system of claim 1, wherein the bypass valve is connected upstream of the air cooler.

5. The intake manifold temperature system of claim 1, wherein the bypass valve is a proportional valve.

6. The intake manifold temperature system of claim 1, wherein the bypass valve is a three-way valve.

7. The intake manifold temperature system of claim 1, wherein the bypass valve is configured to increase the proportion of air flow to the bypass passage when the internal combustion engine is operating at a partial load.

8. The intake manifold temperature system of claim 1, wherein the bypass valve is configured to decrease the proportion of air flow to the air cooler when the internal combustion engine is operating at a partial load.

9. The intake manifold temperature system of claim 1, wherein the air cooler is an air-to-air cooler.

10. The intake manifold temperature system of claim 1, wherein the air cooler is an air-to-liquid cooler.

11. The intake manifold temperature system of claim 1, wherein the bypass passage is completely upstream of each fuel injector of the internal combustion engine.

12. A method for generating commands to actuate a bypass valve of an internal combustion engine system, comprising:

receiving signals from an ambient condition sensor, an air system sensor, and a manifold condition sensor;

determining a desired intake manifold temperature for an intake manifold connected to an internal combustion engine based on the received signals;

generating commands for actuating a bypass valve based on the signals and based on the desired intake manifold temperature, including:

commands for causing the bypass valve to increase a proportion of air flow to a bypass passage when an intake manifold temperature measured with the manifold condition sensor is less than the desired intake manifold temperature, and commands for causing the bypass valve to decrease the proportion of the air flow to the bypass passage when the intake manifold temperature measured with the manifold condition sensor is above the desired intake manifold temperature; and actuating the bypass valve based on the commands such that air is provided to a bypass passage connected downstream of a compressor to provide compressed air to the intake manifold so as to bypass an air cooler.

13. The method of claim 12, wherein actuating the bypass valve further comprises:

increasing a proportion of air flow to the bypass passage when the internal combustion engine is operating at a partial load, and decreasing a proportion of air flow to the air cooler when the internal combustion engine is operating at a partial load.

14. The method of claim 12, wherein the bypass valve is a three-way valve.

15. The method of claim 12, wherein the bypass valve is a proportional valve.

16. The method of claim 12, wherein the desired intake manifold temperature is determined based on a minimum coolant temperature.

17. An intake manifold temperature system, comprising:
an internal combustion engine;
an intake manifold connected to the internal combustion engine;
an air supply system configured to supply compressed air to the internal combustion engine, the air supply system including:
a compressor;
an air cooler connected downstream of the compressor;
a bypass passage connected downstream of the compressor to provide compressed air to the intake manifold so as to bypass the air cooler; and
an electronically-controlled bypass valve connected downstream of the compressor and upstream of the air cooler, the bypass valve configured to:
increase a proportion of air flow to the bypass passage, and
decrease the proportion of air flow to the bypass passage;
an ambient condition sensor located in a compressor intake manifold;
an air system sensor located in a compressor output manifold;
a manifold condition sensor located in the intake manifold connected to the internal combustion engine; and
a controller configured to:
receive temperature signals or pressure signals from the ambient condition sensor, the air system sensor, or the manifold condition sensor,
determine, via a desired intake manifold temperature module, a desired intake manifold temperature based on the received signals; and
generate commands for actuating the bypass valve based on the signals and on the desired intake manifold temperature, including:
commands for causing the bypass valve to increase the proportion of the air flow to the bypass passage when an intake manifold temperature measured with the manifold condition sensor is less than the desired intake manifold temperature while the engine is operating at a partial load, and
commands for causing the bypass valve to decrease the proportion of air flow to the bypass passage when the intake manifold temperature measured with the manifold condition sensor is above the desired intake manifold temperature while the engine is operating at partial load.

18. The intake manifold temperature system of claim 17, wherein the air cooler is an air-to-air cooler.

19. The intake manifold temperature system of claim 17, wherein the air cooler is an air-to-liquid cooler.

20. The intake manifold temperature system of claim 17, wherein the bypass valve is a three-way proportional valve.

* * * * *